3,138,635
NOVEL A-NOR-B-HOMO-STEROIDS
Georges Muller, Nogent-sur-Marne, and Jacques Martel, Bondy (Seine), France, assignors to Roussel-UCLAF, S.A., Paris, France, a corporation of France
Filed June 13, 1962, Ser. No. 202,299
Claims priority, application France June 19, 1961
6 Claims. (Cl. 260—488)

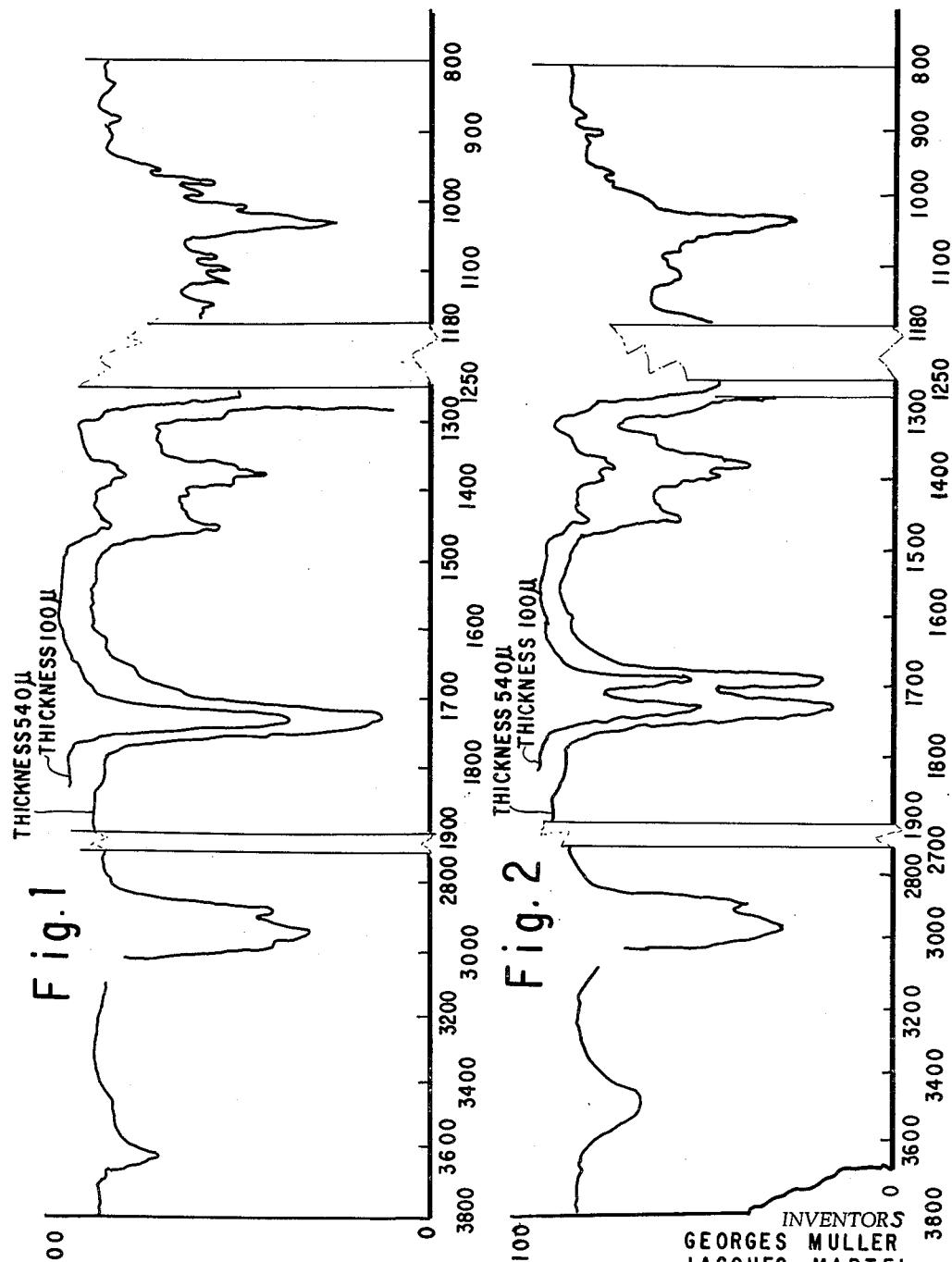

The invention relates to novel A-nor-B-homo-$\Delta^{3(5)}$-estrene-6-ones having the formula

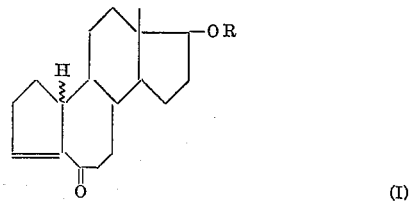

wherein R is selected from the group consisting of hydrogen and an acyl radical of an organic carboxylic acid having 1 to 18 carbon atoms. The invention also relates to a novel process for the preparation of A-nor-B-homo-$\Delta^{3(5)}$-estrene-6-ones of Formula I and to novel intermediates thereof.

The A-nor-B-homo-$\Delta^{3(5)}$-estrene-6-ones of Formula I possess more active hormonal properties than the corresponding classical steroids and have less side effects. The compounds possess androgenic and anabolic activity and may be used in higher concentrations than the classical steroids due to their greater solubilities. The compounds of Formula I are also valuable intermediates for the production of other A-nor-B-homo-steroids by classical chemical or microbiological means.

It is an object of the invention to provide the novel A-nor-B-homo-$\Delta^{3(5)}$-estrene-6-ones of Formula I.

It is an additional object of the invention to provide a novel process for the preparation of the A-nor-B-homo-$\Delta^{3(5)}$-estrene-6-ones of Formula I.

It is a further object of the invention to provide novel intermediates for the preparation of A-nor-B-homo-$\Delta^{3(5)}$-estrene-6-ones of Formula I.

These and other objects and advantages of the invention will become obvious from the following detailed description.

The novel compounds of the invention are A-nor-B-homo-$\Delta^{3(5)}$-estrene-6-ones, having the formula

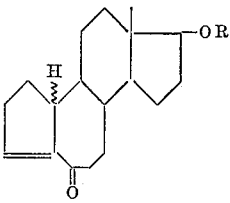

wherein R is selected from the group consisting of hydrogen and an acyl radical of an organic carboxylic acid having 1 to 18 carbon atoms. Examples of suitable organic carboxylic acids are preferably lower alkanoic acids such as acetic acid, propionic acid, butyric acid, etc. However, other organic carboxylic acids may be employed such as benzoic acid and substituted benzoic acids such as 3,5-dinitrobenzoic acid; alkanedioic acids such as succinic acid; hydroxy carboxylic acids such as lactic acid and citric acid; and cycloalkyl carboxylic acids such as hexahydrobenzoic acid, etc.

The process of the invention for the preparation of A-nor-B-homo-$\Delta^{3(5)}$-estrene-6-ones of Formula I comprises catalytically reducing a 17β-acyloxy-A-nor-B-homo-estrane-3,6-dione which exists only in its enolic forms wherein the acyl radical is derived from an organic carboxylic acid having 1 to 7 carbon atoms to form a mixture of 17β-acyloxy-A-nor-B-homo-estrane-6ξ-ol-3-one and 17β-acyloxy-A-nor-B-homo-estrane-6ξ-ol-6-one, separately recovering the components of the mixture, dehydrating 17β-acyloxy-A-nor-B-homo-estrane-3ξ-ol-6-one under alkaline conditions such as an alkali metal lower alkanolate to form A-nor-B-homo-$\Delta^{3(5)}$-estrene-17β-ol-6-one and recovering a compound of Formula I. The free alcohol may be esterified in the 17β-position by reaction with a functional derivative of an organic carboxylic acid having 1 to 18 carbon atoms such as the acid anhydride or the acid halide.

A preferred mode of the process comprises catalytically reducing 17β-acetoxy-A-nor-B-homo-estrane-3,6-dione in its enolic forms in the presence of a palladium catalyst such as palladized carbon black and in acetic acid to form a mixture of 17β-acetoxy-A-nor-B-homo-estrane-6ξ-ol-3-one and 17β-acetoxy-A-nor-B-homo-estrane-3ξ-ol-6-one, separately recovering the components of the mixture by crystallization and chromatography, dehydrating 17β-acetoxy-A-nor-B-homo-estrane-3ξ-ol-6-one by heating in methanol containing sodium methanolate to form A-nor-B-homo-$\Delta^{3(5)}$-estrene-17β-ol-6-one and recovering the latter. The reaction scheme is illustrated in Table I.

TABLE I

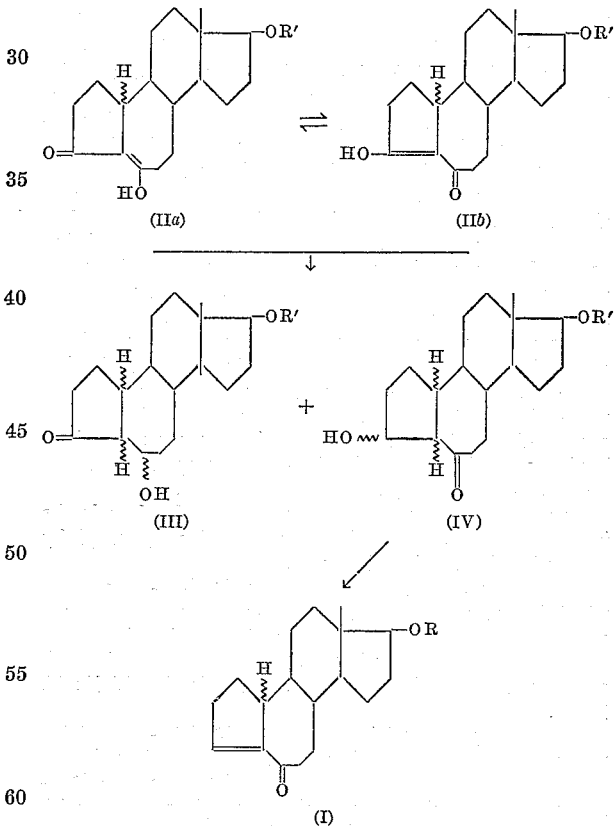

wherein R has the above definition and R' is the acyl radical of an organic carboxylic acid having 1 to 7 carbon atoms.

The 17β-acyloxy-A-nor-B-homo-estrane-6ξ-ol-3-ones are used to prepare 17β-acyloxy-A-nor-B-homo-$\Delta^{5(6)}$-estrene-3-ones by dehydration under acidic conditions as described in our copending, commonly assigned application Serial No. 202,094, filed on even date herewith. The said esters may be saponified to the free alcohol, A-nor-B-homo-$\Delta^{5(6)}$-estrene-17β-ol-3-one, by the usual methods. The said alcohol and its esters also possess androgenic and anabolic activity.

Referring to the drawings:

FIG. 1 is the infrared spectra of 17β-acetoxy-A-nor-B-homo-estrane-6ξ-ol-3-one; (0.05 M in CHCl₃) at 540μ.

FIG. 2 is the infrared spectra of 17β-acetoxy-A-nor-B-homo-estrane-3ξ-ol-6-one; (0.05 M in CHCl₃) at 540μ.

The starting material, 17β-acyloxy-A-nor-B-homo-estrane-3,6-dione, is prepared according to the process described in the commonly assigned, copending application Serial No. 149,221, now Patent No. 3,061,636, which comprises reacting a 17β-acyloxy-Δ⁵⁽¹⁰⁾-estrene-3-one with ozone followed by reduction to form 17β-acyloxy-5,10-seco-estrane-3,5,10-trione, cyclizing the latter under acid conditions to form 17β-acyloxy-A-nor-B-homo-Δ⁵⁽¹⁰⁾-estrene-3,6-dione, reducing the latter with an alkali metal borohydride to form 17β-acyloxy-A-nor-B-homo-5ξ,10ξ-estrane,3,6-dione in its enolic forms.

In the following example there are described several preferred embodiments to illustrate the invention. However, it should be understood that the invention is not intended to be limited to the specific embodiments.

Example

PREPARATION OF Δ³⁽⁵⁾-A-NOR-B-HOMO-ESTRENE-17β-OL-6-ONE

*Step A—Catalytic reduction of the enolic forms of 17β-acetoxy-A-nor-B-homo-estrane-3,6-dione (IIa and IIb).*—2.68 gm. of 17β-acetoxy-A-nor-B-homo-estrane-3,6-dione (enolic form melting at 168° C.), described in U.S. patent application Serial No. 149,221, were dissolved in 25 cc. of acetic acid. 1.3 gm. of palladized carbon black containing 20% of palladium were added and the mixture was hydrogenated for a period of four hours at room temperature. The mixture was then filtered to remove the catalyst. 100 cc. of methylene chloride were added to the solution and the organic phase was washed with water until the wash waters were neutral. The solution was dried over magnesium sulfate and evaporated to dryness under vacuum. 2.7 gm. of a product consisting essentially of a mixture of 17β-acetoxy-A-nor-B-homo-estrane-6ξ-ol-3-one (III) and 17β-acetoxy-A-nor-B-homo-estrane-3ξ-ol-6-one (IV) were thus obtained.

The mixture was taken up in 20 cc. of ether and the ethereal solution was allowed to stand until crystallization occurred. After the crystals were vacuum filtered, washed with ether and dried, 520 mgm. of crystallized 17β-acetoxy-A-nor-B-homo-estrane-6ξ-ol-3-one were obtained having a melting point of 200° C. and a specific rotation [α]_D²⁰=−145° (c.=0.5% in chloroform).

Its structure was confirmed by its spectral values in the infrared which showed the presence of a hydroxyl by a large band at 3598–3611 cm.⁻¹.

17β-acetoxy-A-nor-B-homo-estrane-6ξ-ol-3 - one (III) which is a new compound was soluble in acetone, benzene, chloroform, alcohol and ether, and insoluble in water.

*Analysis.*—C₂₀H₃₀O₄: Molecular weight=334.44. Calculated: C, 71.82%; H, 9.04%. Found: C, 71.7%; H, 9.0%.

17β-acetoxy-A-nor-B-homo-estrane-3ξ-ol-6 - one (IV) was separated by subjecting the ethereal mother liquors after removal of 17β-acetoxy-A-nor-B-homo-estrane-6ξ-ol-3-one (III) to chromatography through alumina with benzene. After recrystallization from hexane, 250 mgm. of the crystallized product were obtained having a melting point of 148° C. and a specific rotation [α]_D²⁰=+125° (c.=0.5% in chloroform).

Its structure was confirmed by the spectral values in the infrared which showed the presence of a hydroxyl and the presence of an absorbing carbonyl at 1685 cm.⁻¹ in chloroform and at 1688 cm.⁻¹ in carbon disulfide.

17β-acetoxy-A-nor-B-homo-estrane-3ξ-ol-6 - one (IV) which is new was soluble in acetone, benzene, chloroform, alcohol and ether, and insoluble in water.

*Analysis.*—C₂₀H₃₀O₄: Molecular weight=334.44. Calculated: C, 71.82%; H, 9.04%. Found: C, 72.2%; H, 9.0%.

*Step B—Dehydration of 17β-acetoxy-A-nor-B-homo-estrane-3ξ-ol-6-one (IV).*—500 mgm. of 17β-acetoxy-A-nor-B-homo-estrane-3ξ-ol-6-one (IV) obtained in the preceding step were dissolved in 5 cc. of methanol and 0.5 cc. of 10 N aqueous sodium hydroxide. The solution was heated for forty-five minutes at reflux. After cooling, 20 cc. of methylene chloride were added and the organic phase was washed with water. The organic phase was dried over magnesium sulfate and evaporated to dryness under vacuum. The residue was taken up in 25 cc. of methylene chloride and subjected to chromatography over 25 gm. of Brockmann alumina. The column was eluted first with methylene chloride, then with methylene chloride containing 2% of methanol. During elution of the chromatogram by the mixture of methylene chloride containing 2% of methanol, there was obtained a resin which, when taken up in a small amount of ether, crystallized. After vacuum filtering and drying the crystals, A-nor-B-homo-Δ³⁽⁵⁾-estrane-17β-ol-6-one having a melting point of 153° C. and a specific rotation [α]_D²⁰=+42°±3° (c.=0.5% in chloroform) was obtained. The infrared spectra showed the presence of a band at 1670 cm.⁻¹ which proved the existence of a carbonyl on a heptagonal ring conjugated with a double bond.

*Analysis.*—C₁₈H₂₆O₂: Molecular weight=274.4. Calculated: C, 78.8%; H, 9.6%. Found: C, 78.6%; H, 9.5%.

This product is new.

A-nor-B-homo-Δ³⁽⁵⁾-estrene-17β-ol-6-one can be esterified to form the corresponding 17β-acyloxy-A-nor-B-homo-Δ³⁽⁵⁾-estrene-6-one by reaction with an acid anhydride such as acetic acid anhydride or with an acid halide such as acetyl chloride.

Various modifications of the process of the invention such as using other reduction catalysts and different solvents may be made without departing from the spirit or scope thereof and it is to be understood that the invention is to be limited only as defined in the appended claims.

We claim:

1. A-nor-B-homo-Δ³⁽⁵⁾-estrene-6-ones having the formula

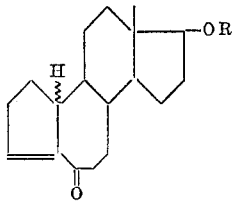

wherein R is selected from the group consisting of hydrogen and an acyl radical of an hydrocarbon carboxylic acid having 1 to 18 carbon atoms.

2. A-nor-B-homo-Δ³⁽⁵⁾-estrene-17β-ol-6-one.

3. A-nor-B-homo-estranes having the formula

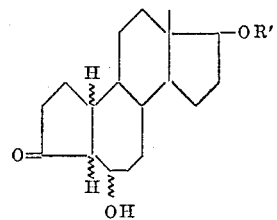

wherein R′ is an acyl radical of an hydrocarbon carboxylic acid having 1 to 7 carbon atoms.

4. 17β-acetoxy-A-nor-B-homo-estrane-6ξ-ol-3-one.

5. A-nor-B-homo-estranes having the formula
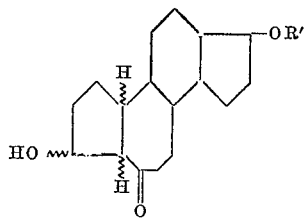
wherein R' is an acyl radical of an hydrocarbon carboxylic acid having 1 to 7 carbon atoms.
6. 17β-acetoxy-A-nor-B-homo-estrane-3ξ-ol-6-one.
References Cited in the file of this patent
UNITED STATES PATENTS
2,782,212    Heusser et al. _____ Feb. 19, 1957
3,040,092    Muller et al. _____ June 19, 1962